Figures 3, 4:
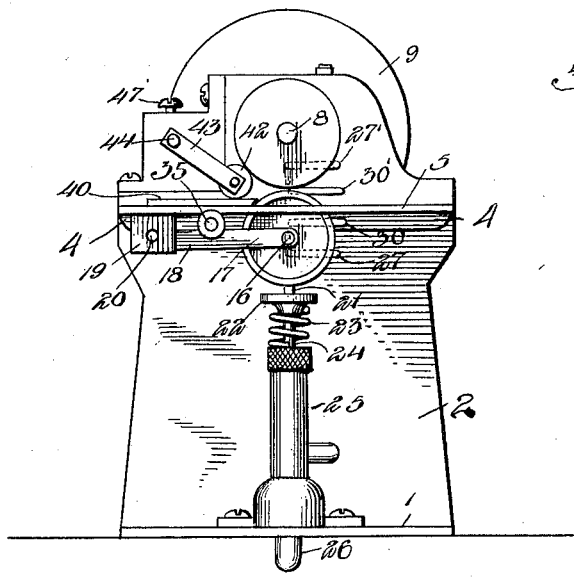

D. P. MOORE.
SEAM DAMPENER.
APPLICATION FILED NOV. 5, 1908.
1,005,735.
Patented Oct. 10, 1911.
3 SHEETS—SHEET 1.
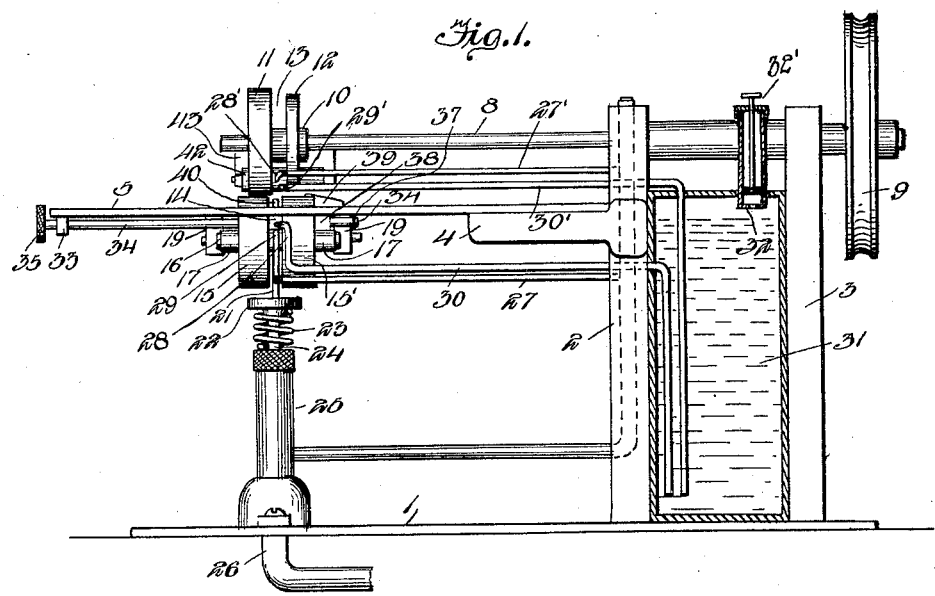
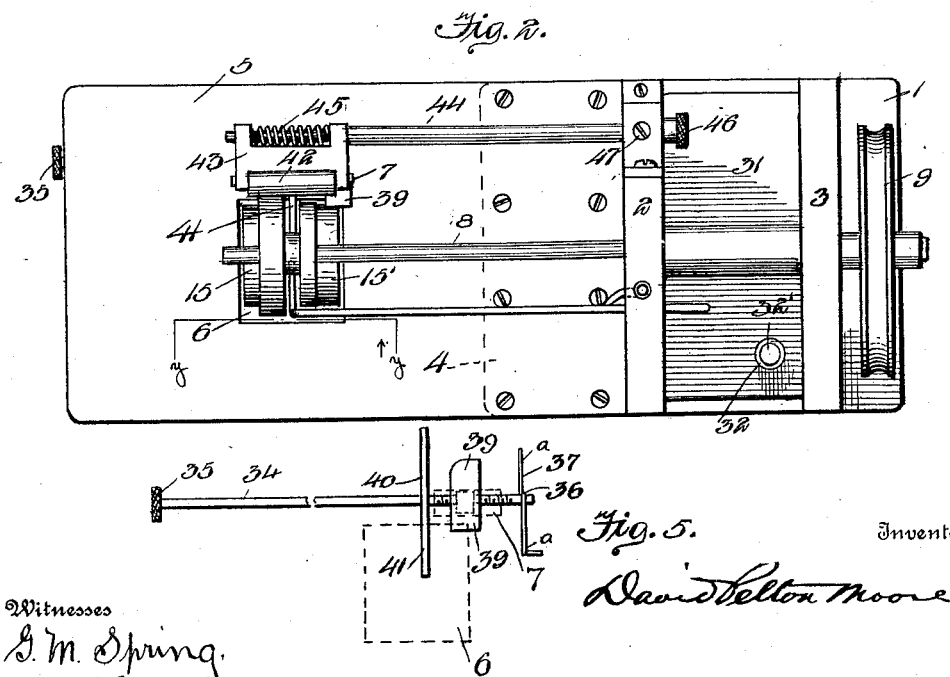
Witnesses
G. M. Spring
A. B. Clarke
Inventor
David Velton Moore

D. P. MOORE.
SEAM DAMPENER.
APPLICATION FILED NOV. 5, 1908.

1,005,735.

Patented Oct. 10, 1911.
3 SHEETS—SHEET 2.

Witnesses
B. M. Spring.
A. B. Clarke,

Inventor
David Pelton Moore.

D. P. MOORE.
SEAM DAMPENER.
APPLICATION FILED NOV. 5, 1908.
1,005,735.
Patented Oct. 10, 1911.
3 SHEETS—SHEET 3.
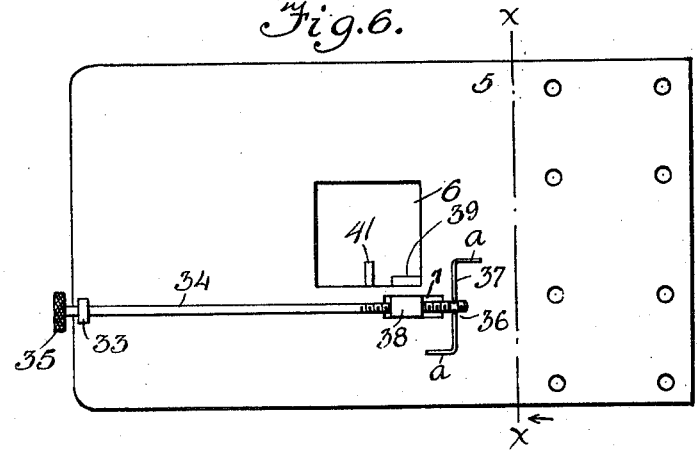
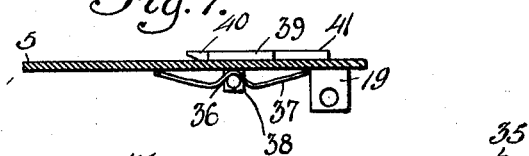
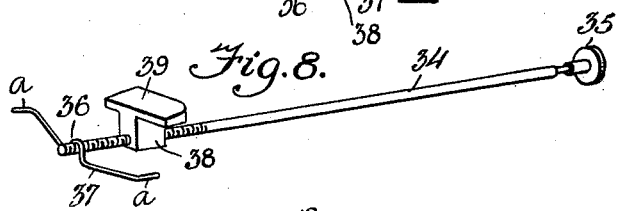
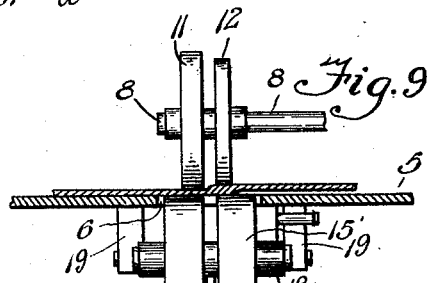
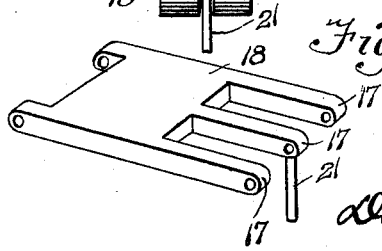
WITNESSES
G. M. Spring.
Ralph Healy
INVENTOR
David Delton Moore

UNITED STATES PATENT OFFICE.

DAVID PELTON MOORE, OF WASHINGTON, DISTRICT OF COLUMBIA.

SEAM-DAMPENER.

1,005,735.  Specification of Letters Patent.  Patented Oct. 10, 1911.

Application filed November 5, 1908. Serial No. 461,119.

*To all whom it may concern:*

Be it known that I, DAVID PELTON MOORE, a citizen of the United States, residing at Washington, in the District of Columbia, have invented certain new and useful Improvements in Seam-Dampeners, of which the following is a specification, reference being had therein to the accompanying drawing.

My present invention relates to improvements in seam dampeners, and has for its object the provision of a machine for dampening the seams of turn down collars, the moistening mechanism being so arranged and adjusted as to allow the thickness or "ply" of the collar at the point to be dampened, to regulate the amount of moisture to be admitted to the particular portion of the collar, while the seam of the collar coacts with a stationary guide and a laterally adjustable guide, to guide the collar to and through the moistening mechanism. The particular moistening mechanism is broadly covered in my U. S. Patent No. 882,334 granted to me March 17th, 1908.

It is a known fact, that in the seam dampeners now in general use, that at the insertion of the collar, the bulk at the edge, tends to retard the feeding of the collar, and where belts and moisture carrying wheels are used, this action causes too great an amount of moisture to touch the collar, while when the collar is leaving the machine, the thickness at the end just leaving is snapped quickly from the machine, and in most cases does not receive the proper amount of moisture. The body part of the collar no matter what the ply may be, receives at all times the same amount of moisture and often receives more than is necessary, so that when the collar is turned upon the seam just dampened, the end of the fold is often cracked, while the body portion is wrinkled more or less. By producing a machine, which dampens according to the thickness or ply of the collar at the portion to receive the moisture, I obviate all of these difficulties, and cause each collar to receive just the proper amount of moisture. Furthermore, I employ with my dampening mechanism a collar guiding device, which is adjustable to cause the collar to be fed to present the desired portion between the moistening devices, and provide an adjustable tension device which holds the collar so that the seam is always properly presented.

In the apparatus herein shown, I employ an atomizing means for spraying moisture upon opposite sides of the collar.

To clearly illustrate my invention, attention is invited to the accompanying drawings, in which:—

Figure 1 is a side elevation of the complete seam dampener, the water tank, being in section. Fig. 2 is a top plan view. Fig. 3 is an end view thereof. Fig. 4 is a top plan view of a portion of the machine showing the collar guiding mechanism; Fig. 5 is a top skeleton view of lower parts thereof. Fig. 6 is a bottom plan view of the shelf. Fig. 7 is a section through the shelf on line $x$—$x$, Fig. 6, looking toward the spring 37. Fig. 8 is a perspective view of the guide block 39 and its connection with screw 34. Fig. 9 is a section on line $y$—$y$, Fig. 2, showing a collar between the feeding means. Fig. 10 is a perspective view of frame 18 removed.

Referring to the drawings:—The numeral 1 designates the base, which has rising upwardly therefrom the two parallel supports or standards 2 and 3, to the outer face of one of which, standard 2, is a bracket 4, to which is removably secured and supported the shelf or plate 5. Cut in the body of the shelf or plate is the large centrally arranged rectangular opening 6, and the small elongated opening 7. Journaled in the upper portions of the two standards is a shaft 8, which carries upon one end the belt pulley 9, and upon its other end the hub 10, carrying the wheel 11, and the smaller disk 12, both of which are separated by the space 13, which is of the same width as the space 14, between the two wheels 15 and 15', which are adapted to project through the opening 6 and above the upper face of the shelf. These two wheels are journaled upon the shaft 16, carried by the arms 17 of the frame 18, which is swingingly secured to the two lugs 19, by means of the pin or shaft 20. Projecting downwardly from the center arm 17, is a pin or lug 21, which rests upon the button or head 22, of the spring closed valve. The spring 23 is mounted upon the stem 24 of the valve, which is slidably mounted within its casing 25, so as to normally hold the two wheels 15 and 15' upwardly so that the wheel 15 is in contact with the wheel 11, so that as the wheel 11 is revolved through the medium of its shaft and belt pulley the wheel 15 is also revolved. Thus should a collar be passed between the wheels 11 and 15, it would be fed therebetween, as the wheel 11 is revolved, the thickness of the collar moving the wheels 15 and 15', downwardly depressing the valve, so that the air under pressure, which I employ as an assisting agent, passing through the pipe 26, will be admitted to the pipes 27 and 27', and passes through the nozzles 28 and 28' of said pipes, and is projected against the water nozzles 29 and 29', of the water conveying pipes 30 and 30', thereby projecting or atomizing moisture upon both sides of the collar at the point between the spaces 13 and 14, the nozzles of the various pipes being located in said spaces.

The water pipes 30 and 30', receive their supply from the tank or reservoir 31, which is provided with the removable cap 32, which carries the air pump 32', by means of which pressure may be had within the tank to facilitate the passage of the water to the nozzles. This pressure, however, is very small and to such a degree as to not cause a continuous flow of water through the pipes 30 and 30'. In other words, it is only desired to furnish water to and within the nozzles 29 and 29', so that when the air from the nozzles 28 and 28', acts upon said nozzles 29 and 29', that the proper amount of water is sprayed or atomized upon the collar. This constitutes the dampening apparatus.

When a collar is inserted and passes between the feeding rollers, the thin portion of the turn-down collar passes between the wheels 11 and 15, while the thicker portion is directly below the smaller wheel 12, and in contact with the wheel 15', thus by making the space between the wheels 12 and 15', greater than that between the faces of the wheels 11 and 15, I do not bring the action of the wheels 12 and 15', into play, unless the thickness at the seam of the collar is such that the faces of the wheels 12 and 15', are engaged, the thinner portion of the collar between the wheels 11 and 12, in most cases, being the only portion receiving pressure upon both sides by the wheels.

In order that the collar may be guided so that the proper portion thereof is adjacent to the spaces 13 and 14, and thereby in a position to be acted upon, I provide an apertured lug 33, upon the under side of the shelf, and in this, I mount the feed or adjusting screw 34, whose outer end is provided with the milled head 35, while the inner end is grooved to receive the loop 36 of the spring support 37. The terminals a, of this spring support engage the underside of the shelf and have a tendency to hold the inner end of the screw 34 away from the shelf and as the lug 38 projects through the opening or slot 7, and is threaded upon the feed screw 34, the under face of the guide block 39, is held downwardly upon the upper face of the shelf by said spring support. As the feed screw is revolved the lug 38 is moved within the opening 7, to or from the stationary co-acting guide 40, rigidly fixed upon the upper face of the shelf and directly in line with the center of the space 14, the inner end 41 of the same extending well over the opening 6. These constitute the lower members of the collar guide, and in order to hold the collar down upon the guides 39 and 40, I employ the roller 42, which is journaled in the end of the frame 43, which is carried upon the shaft 44, and by means of the coiled spring 45, is given a tension toward the guides 39 and 40. In order to regulate the tension of the spring 45, one end of it is connected to the frame and the other to the shaft, so that when the shaft is revolved in either direction, through the medium of the milled head 46, the spring is either wound tighter or made looser, the shaft being held at the desired adjustment by means of the set-screw 47.

From the foregoing description taken in connection with the drawings, the operation of my seam dampener can be readily understood and its advantages fully appreciated, but briefly stated it is as follows:—The feed-screw 34 is first operated to bring the guide 39 nearer to or farther away from the stationary guide 40, according to the width of the seam at the fold of the collar, the abutting portion of the seam being adapted to abut the inner face of the guide 40, so that the portion of the collar to receive the moisture will at all times be presented to the spaces 13 and 14. The feeding mechanism being in motion, the collar is now placed between the roller 42 and the guides 39 and 40, and pushed through until the wheels 11 and 15 grip the collar and take it through the machine, the guides at all times presenting the proper portion of the collar to the spaces 13 and 14, so that as the wheel 15 and its frame are depressed by the action of the ply of the collar thereon, the valve is operated to admit air so that water is atomized upon the desired portion of the collar. As soon as the collar has passed the wheels 11 and 15, the wheel 15 is moved upwardly by the action of the valve's spring and into engagement with the wheel 11, thus at the same time allowing the valve to close and cut off the air. This valve is substantially the same valve shown in my patent upon dampening machines, #882,334, issued to me March 17th, 1908.

What I claim, as new, is:—

1. In a seam dampening machine, the combination of a frame, a shelf carried thereby, moistening devices operably mounted and disposed in operative relation to the shelf, two independently supported seam-edge guides, of which one is rigidly fixed upon the shelf in front of the moistening devices, the other of said guides being adjustable sidewise with relation to the fixed guide, means connected with the adjustable guide for imparting thereto at will a sidewise movement with relation to the fixed guide, and a presser disposed to coöperate with said guides.

2. In a seam dampener, the combination with a support, of a power driven collar feeding means, moisture supplying means, a stationary and an adjustable co-acting guide disposed in front of the feeding means, an adjustable rod carried by the support above the co-acting guides, a frame carried upon the rod, a spring to hold the frame toward the guides, and a roller mounted in the lower end of the frame adapted to bear upon the guides.

3. In a seam dampener, the combination with a support and a shelf carried thereby, of a power driven feeding means, moisture supplying means controlled by said feeding means and the collar to be dampened, a stationary and an adjustable co-acting guide carried by the shelf and opposed to the feeding means, and a spring actuated presser for holding the collar upon said co-acting guides before and during its passage through the feeding means.

4. In a seam dampener, the combination with a support and a shelf carried thereby, of a power driven feeding means, moisture supplying means controlled by said feeding means and the collar to be dampened, a stationary and an adjustable co-acting guide carried by the shelf and opposed to the feeding means, an adjustable rod carried by the support and projecting over the shelf and above the co-acting guides, and a spring actuated presser carried by said rod and bearing upon said guides.

5. In a seam dampener, the combination with a support and a shelf carried thereby, of a power driven feeding means, moisture supplying means controlled by said feeding means and the collar to be dampened, a stationary and an adjustable co-acting guide carried by the shelf and opposed to the feeding means, an adjustable rod carried by the support and projecting over the shelf and above the co-acting guides, a frame carried upon the rod, a spring to hold the frame toward the shelf, and a roller mounted in the lower end of the frame adapted to bear upon the guides.

In testimony whereof I affix my signature in presence of two witnesses.

DAVID PELTON MOORE.

Witnesses:
B. C. RUST,
G. M. SPRING.

---

Copies of this patent may be obtained for five cents each, by addressing the "Commissioner of Patents, Washington, D. C."